United States Patent [19]

Barricks et al.

[11] Patent Number: 4,660,039
[45] Date of Patent: Apr. 21, 1987

[54] SYSTEM FOR LOCATING A SPORT OBJECT

[76] Inventors: Mary S. Barricks, 320 E. Brook Hollow, Phoenix, Ariz. 85022; Robert A. Yereance, 6942 W. Olive Ave., Phoenix, Ariz. 85348

[21] Appl. No.: 701,716

[22] Filed: Feb. 14, 1985

[51] Int. Cl.[4] ............................................. G01S 13/04
[52] U.S. Cl. ...................................... 342/27; 273/213
[58] Field of Search .................... 340/572; 343/6.5 R, 343/6.5 SS, 6.8 R, 5 PD; 273/213; 342/27, 42, 43, 51

[56] References Cited

U.S. PATENT DOCUMENTS 3,645,528  2/1972  Cornell ........................ 343/6.5 R X
4,031,535  6/1977  Isbister ........................... 343/6.5 R

FOREIGN PATENT DOCUMENTS 1530266  10/1978  United Kingdom ............... 273/213

Primary Examiner—Thomas H. Tarcza
Assistant Examiner—Bernarr Earl Gregory
Attorney, Agent, or Firm—Joseph H. Roediger

[57] ABSTRACT

A locating system for sport objects where the user carries an r.f. transmitter, and the sport object has a conductive stripe thereon which increases the load on the transmitter as it moves closer to the sport object. The conductive stripe has an effective length of one-quarter wavelengths at the signal frequency to act as a tuned antenna.

18 Claims, 4 Drawing Figures

SYSTEM FOR LOCATING A SPORT OBJECT

BACKGROUND OF THE INVENTION

This invention relates to apparatus for providing improved locating ability for sport objects propelled a distance from the participant and, in particular, to a system for locating a golf ball.

In the conduct of many sporting activities, a sport object is caused to travel at great distances from the player, and visual contact may be lost during the flight of the object. As a result, it is often difficult to later locate the sport object after it has left the situs of the user. This is especially true in games such as golf wherein a relatively small ball is propelled about a course which is intentionally designed with hazards and long grass to provide a difficult playing environment for the participant. Every golfer has experienced the frustrations of being unable to locate the ball after he has made a long distance stroke. Not only is there frustration for the participant in the sport, but also there is a cost factor involved due to lost objects when one is playing in an environment which is especially rough or obscured. Thus, sport enthusiasts and particularly golfers have long yearned for an effective, reliable and compact system which assists in locating the sport object after it has been struck.

Previously attempts have been made to incorporate active electronic devices within the golf ball itself. These attempts have not met with commercial success for a number of factors including the resulting changes in the characteristics of the ball. In any sporting activity, rules and regulations prescribe the character and nature of the object used in the playing of the sport. Golf is no different and, in fact, may be more heavily regulated than most sporting activities since the dimensions, weight, surface character, and resiliency of the balls must meet with approval by a regulatory authority before the ball can be used in competitive play. The modification of a sport object so it is outside the prescribed regulations has resulted in the so-modified objects not receiving commercial success when introduced to the marketplace.

Thus in order to gain commercial acceptance, it is recognized that any sport object modified for use with a locating system should not alter the object by the incorporation of elements therein. Furthermore, any tracking apparatus utilized in combination with a modified sport object has to be transported by the user as he moves about the playing field. This apparatus must be small in size, light in weight, reliable and modest in cost in order to enjoy participant acceptance. The present invention relies on a particular configuration of conductive material placed on the surface of the ball so that the sport object can be manufactured in the normal manner according to the prescribed standards of the sport with additional non-intrusive coating steps employed thereafter.

Accordingly, it is an object of the present invention to provide a relatively compact and reliable tracking system for a sport object propelled at a distance from the user wherein the user receives an indication as he gets closer to the object. Furthermore, the only modification to the object is a coating placed thereon to aid in the tracking of an object which has come to rest at a distance from the user. This coating is preferably applied after the typical manufacturing processes have been completed.

SUMMARY OF THE INVENTION

This invention relates to apparatus for providing or enhancing the locating ability of a sport participant for objects which are to be propelled at great distances from the participant or system user.

The user is provided with a small compact transmitter of r.f. electrical signals. The transmitter comprises a signal generating means, typically battery powered, for providing an electrical signal having a frequency within a predetermined bank of frequencies. Antenna means is coupled to the signal generating means for radiating the electrical signal. Also contained in the transmitter is an indicator that is responsive to the signal generating means and which indicates changes in magnitude of the signal. In preferred embodiments, a frequency adjusting means is provided so that the frequency of the signal generated can be varied throughout the predetermined frequency band.

The sport object, typically a golf ball, has its outer surface provided with conductive means which are affixed to the surface thereof. The conductive means are selected so as to have a length which is a function of one quarter of a wavelength at a frequency within the predetermined band. As the signal is radiated from the antenna, it encounters the sport object with the conductive means affixed to its surface. When the object is proximate to the transmitter, the load on the signal generating means is changed.

At the position on the sport field of play that the conductive means first encounters the radiated signal, the signal generating means sees an increased load and therefore is caused to provide an increased power output. The power output is an inverse function of the distance between transmitter and sport object. The indicating means, which can be either analog or digital, provides a visual readout for the user when he gets within viewing distance of the ball. Further features and advantages of this invention will become more readily apparent from the following detailed description of the preferred embodiment thereof when viewed in conjunction with the accompanying drawings.

DESCRIPTION OF THE PREFERRED EMBODIMENT

Figure 1:
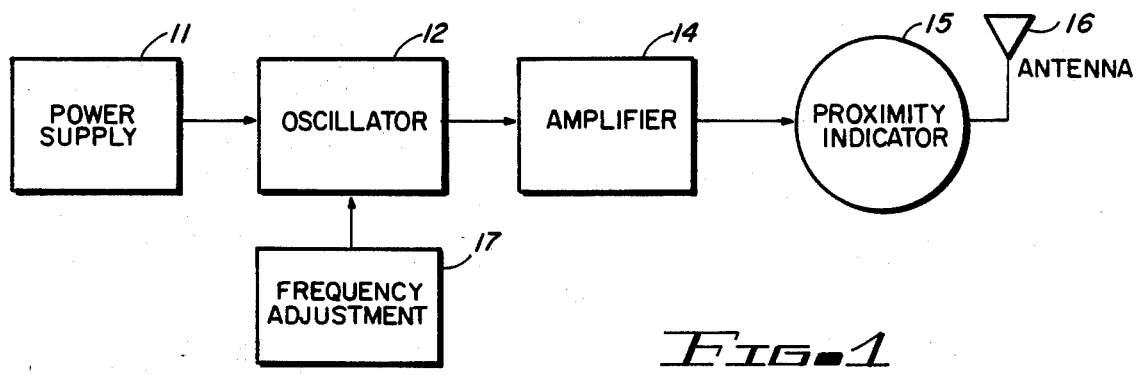
FIG. 1 is a block schematic diagram of an embodiment of the invention.

Referring now to FIG. 1, a transmitter constructed in accordance with the present invention is shown as comprising an oscillator 12 coupled to a power supply 11. The oscillator is a solid state oscillator capable of providing an r.f. signal and is of conventional design. The power supply is normally a battery since the system is to be used out in the field or on the golf course. The output signal of the oscillator is supplied to an amplifier 14 which increases signal strength and from there is supplied via proximity indicator 15 to an antenna 16. The antenna radiates this single frequency signal into the surrounding environment. While the oscillator 12 may be a single frequency oscillator, it is preferable that it be provided with tuning capability so that the frequency of the signal generated may be moved or tuned within a predetermined band. A frequency adjustment device 17 is shown coupled to the oscillator 12.

Figure 2:
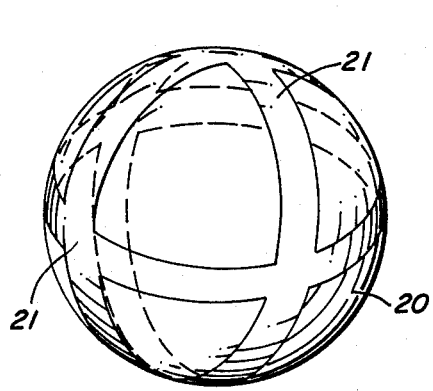
FIG. 2 is a view in perspective of a sport object coated with conductive means in accordance with one embodiment of the invention.
Figure 3:
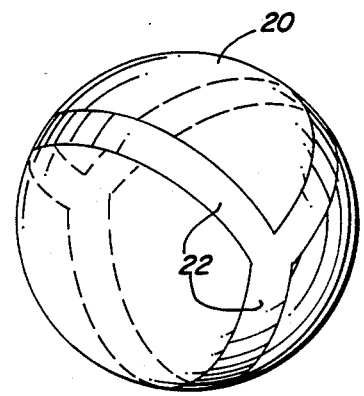
FIG. 3 is a perspective view of a second embodiment of a sport object provided with conducting means in accordance with the present invention.

The sport object is shown in FIG. 2 as a golf ball 20 having conductive stripes 21 formed on the surface thereof. In this embodiment, three mutually perpendicular rings are formed on the ball's surface. The length of each ring is slightly greater than 3 times the diameter of the sport object, in this case the golf ball, but the effective length as seen by the observer and the transmitter is essentially equal to the diameter of the ball. This particular configuration of conductive stripes ensures that at least one conductive stripe is presented upwardly when the ball comes to rest. FIG. 3 shows a second embodiment of a sport ball provided with three half rings angularly disposed in relation to each other at 120°. In this embodiment, the length of each conducting stripe is but one-half that of the embodiment of FIG. 2. However, it can be seen that an observer will note an effective length equal to the diameter of the ball when the object is viewed at rest.

The frequency band for the transmitter is selected in relationship to the size of the sport object, which in this case is the diameter of the golf ball. As mentioned, each conducting stripe on the golf ball has an effective length when the ball is at rest equal to the diameter of the ball. This effective length is equal to N quarter wavelengths at a signal frequency within the predetermined band, where N is an integer. Thus, the conducting stripe acts as a tuned antenna for the transmitted signals. When the transmitter is in proximity to a sport object having the conducting stripes thereon, the conducting stripe, acting as a tuned antenna, increases the load presented to the transmitter since it absorbs energy and reradiates in a broad pattern. As a result, the power drawn from the transmitter increases, and this increase can be detected by the proximity indicator 15.

The dimensions of the sport object 20 having the conductive stripes on the surface thereof determine the wavelength and frequency of the signal to be radiated from antenna 16. Since frequency is inversely related to wavelength, the use of short conducting stripes raises the desired operating frequency of the transmitter into the r.f. range. In the case of a golf ball, a diameter of 1.68 inches maximum is specified by those regulations governing the sport in this country. If the diameter is to be related to frequency, it is found that a frequency of 8,768 megahertz is indicated for the transmitter. This is approximately the frequency at which the diameter of the golf ball is a full wavelength. However, it is easier to generate lower frequencies, and therefore a frequency of one-fourth this frequency or 2,192 megahertz is the preferred signal frequency.

Since European golf balls differ somewhat from American golf balls in diameter, the oscillator 12 is selected so that it can provide a predetermined range of frequencies which would include both the European and American golf ball diameters as N quarter wavelengths where N is an integer. The frequency adjustment 17 coupled to the oscillator 12 permits the user to vary the output frequency corresponding to the type of ball used. It will be recognized that the use of conductive stripes on larger sport objects normally results in the stripe length itself being determinative of the wavelength of the signal to be generated and radiated.

In operation, a low power oscillator has its output signal amplified, coupled through the proximity indicator 15, and supplied to a tuned or resonant antenna. The antenna of the transmitter itself has a length of N quarter wavelength at a signal frequency within the predetermined frequency range. The loading of the transmitter resulting in an indication on the proximity indicator 15 is influenced by the electrical load of the tuned antenna on the sport object. This load can be varied by selecting specific electrical resistances for the conducting stripes. In practice, it has been found that conductive paints presently utilized in printed circuit applications are satisfactory for this purpose. Some of the paints contain metallic inclusions, typically silver, which provide a very low electrical resistance. Others however use graphite or other forms of carbon, and thus provide higher resistances. In both cases, a cover coat formed of a durable material, such as polyurethane, is utilized to guard the conductive stripes against the abrasive effects of high impacts.

Figure 4:
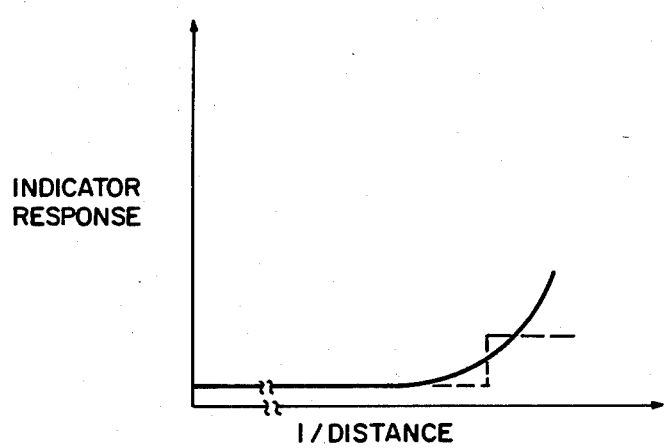
FIG. 4 is a diagram indicating the response of the embodiment of FIG. 1 to the distance to the sport object.

In operation, the user holds the transmitter aiming the signal in the general direction of the flight of the sport object and observes the proximity indicator as he walks along the general flight path. If the user should encounter a metal mass such as a container, a relatively small amount of energy is absorbed when contrasted with that of a tuned antenna. The conducting stripes having the particular length relationship to the frequency of the transmitted signal absorb the energy and reradiate it as an omni directional antenna at that frequency. Thus, the energy absorbed by the conducting stripes is retransmitted over a large area and only a very minor or insignificant portion is returned to the antenna 16 of the transmitter. The proximity of the transmitter to the sport object is shown on indicator 15. Two different responses are shown in the curve of FIG. 4 wherein the solid curve is indicative of the response shown by a volt meter or ammeter coupled into the transmitter circuit. Thus, the curve increases with the reciprocal of distance between transmitter and sport object. In the case of an optically excited indicating element, for example a light-emitting-diode, the curve is dashed and shows a step function wherein the higher response occurs when the diode is energized thereby providing a visual indicator or digital readout to the user. The proximity indicator 15 can be calibrated so that the user knows that when the diode is energized, he is within a certain distance of the ball. A plurality of diodes can be employed each having a different threshold to indicate a different distance to the sport object.

While the foregoing description has referred to specific embodiments of the invention utilized with golf balls, it should be recognized that variations and modifications can be made therein so that other sport objects can utilize the teachings of the present invention without departing from the spirit and scope of the claims set forth herein.

What I claim is:

1. Apparatus for providing improved locating abilities for sports projectiles of the type to be propelled at great distances from the user, said apparatus comprising:
   (a) signal generating means for providing a single frequency signal within a predetermined band of frequencies;

(b) antenna means coupled to said signal generating means for radiating said electrical signal;

(c) indicating means responsive to the signal generating means for indicating changes in magnitude of the generated signal;

(d) a sports projectile having an outer surface; and (e) conductive strip means affixed to the outer surface of said sports projectile, said conductive strip means increasing the load on said generating means when encountered by the signal radiated from said antenna means.

2. Apparatus in accordance with claim 1 wherein said conductive strip means comprises at least one conductive stripe located on the outer surface of said sports projectile, said strip having an effective length that is N quarter wavelengths at a frequency within said band, where N is an integer.

3. Apparatus in accordance with claim 2 wherein said conductive strip means comprises at least three conductive strips located on said sports projectiles, said strips being angularly disposed thereon.

4. Apparatus in accordance with claim 3 wherein said conductive strip means comprises three conductive strips each having first and second ends with an effective length of one-quarter wavelength, said stripes being disposed at 120 degree angles on the surface of said sports projectile with said first and second ends of the three strips being interconnected.

5. Apparatus in accordance with claim 3 wherein said conductive strip means comprises three conductive strips encircling said sports projectile and disposed at right angles on the surface thereof.

6. Apparatus in accordance with claim 2 wherein said antenna means has a length that is N quarter wavelengths at a frequency within said band, where N is an integer, the electrical load on said antenna being increased by the proximity thereof to the sports projectile.

7. Apparatus in accordance with claim 6 wherein said sport projectile is spherical in shape with a diameter that is N Quarter wavelengths at a frequency within said band, where N is an integer.

8. Apparatus in accordance with claim 7 further comprising frequency adjusting means coupled to the signal generator for varying the frequency of the signal within the predetermined band.

9. Apparatus in accordance with claim 1 wherein said sports projectile is spherical having a diameter that is N quarter wavelengths at a frequency within said band where N is an integer.

10. Apparatus in accordance with claim 9 wherein said conductive strip means comprises at least one conductive strip located on the outer surface of said projectile and having an arc length of 180 degrees.

11. Apparatus in accordance with claim 10 wherein said conductive strip means comprises three conductive strips each having an arc length of 180 degrees and angularly disposed at 120 degrees on the surface of said projectile.

12. Apparatus in accordance with claim 9 wherein said conductive strip means comprises at least one circumferential conductive strip.

13. Apparatus in accordance with claim 12 wherein said conductive strip means comprises three mutually perpendicular circumferential conducting strips.

14. A sports projectile having apparatus affixed thereto for location by a source of electrical signals having a selected frequency, said projectile comprising:

(a) an outer surface bounding the peripheral region of said projectile; and (b) at least one conducting strip formed on the outer surface of the sports projectile, said conducting strip having an effective length that is N quarter wavelengths at the selected frequency, where N is an integer, said conductive strip increasing the electrical load on the signal source when the distance therebetween is reduced.

15. The sports projectile of claim 14 wherein said outer surface is spherical with a diameter that is N quarter wavelengths at the selected frequency, where N is an integer, and said at least one conductive strip defines an arc of 180 degrees on the spherical surface.

16. The sports projectile of claim 15 further comprising three conducting strips formed on said spherical surface, and each defining an arc of 180 degrees on the spherical surface and being angularly disposed at 120 degrees in relation to each other.

17. The sports projectile of claim 15 further comprising three conductive strips each of which encircles the spherical surface and is mutually perpendicular with the other strips thereon.

18. The sports projectile of claim 14 wherein said outer surface is spherical with a diameter that is N quarter wavelengths at the selected frequency, where N is an integer, and said at least one conductive strip encircles the spherical surface.

* * * * *